US007947316B2

(12) United States Patent
Kirschner et al.

(10) Patent No.: US 7,947,316 B2

(45) Date of Patent: May 24, 2011

(54) POD FOR DISPERSIBLE MATERIALS

(75) Inventors: Jonathan Kirschner, Powder Springs, GA (US); Paul A. Phillips, Marietta, GA (US)

(73) Assignee: The Coca-Cola Company, Atlanta, GA (US)

(*) Notice: Subject to any disclaimer, the term of this patent is extended or adjusted under 35 U.S.C. 154(b) by 1306 days.

(21) Appl. No.: 11/462,444

(22) Filed: Aug. 4, 2006

(65) Prior Publication Data

US 2008/0028948 A1 Feb. 7, 2008

(51) Int. Cl.
*A47J 31/06* (2006.01)

(52) U.S. Cl. ............... 426/77; 426/426; 99/275; 99/295

(58) Field of Classification Search .................... 426/77, 426/426; 99/275, 295

See application file for complete search history.

(56) References Cited

U.S. PATENT DOCUMENTS 1,951,357 A 3/1934 Hall
2,589,783 A * 3/1952 Crossley et al. ................ 99/295
2,743,664 A 5/1956 Dale
2,778,739 A 1/1957 Rodth
2,968,560 A 1/1961 Goros
3,151,418 A 10/1964 Powell et al.
3,269,298 A * 8/1966 Grundmann ................ 99/289 R
3,275,448 A 9/1966 Sommer
3,428,460 A 2/1969 Ely
3,589,272 A 6/1971 Bouladon
3,713,842 A 1/1973 Lubsen et al.
3,812,273 A 5/1974 Schmidt
3,823,656 A 7/1974 Vekekn
3,888,999 A 6/1975 Jones et al.
3,952,641 A 4/1976 Vitous
4,011,969 A * 3/1977 Martin .......................... 222/196
4,081,560 A 3/1978 Ishigaki
4,107,339 A 8/1978 Shrimpton
4,136,202 A 1/1979 Favre
4,158,330 A 6/1979 Vitous
4,254,694 A 3/1981 Illy
4,429,623 A 2/1984 Illy
4,436,125 A * 3/1984 Blenkush ...................... 141/330
4,471,689 A 9/1984 Piana
4,581,239 A 4/1986 Woolman et al.
4,644,855 A 2/1987 Woolman et al.
4,798,732 A 1/1989 Osawa
4,829,889 A 5/1989 Takeuchi et al.
4,846,052 A 7/1989 Favre et al.

(Continued)

FOREIGN PATENT DOCUMENTS

BE 701863 1/1968

(Continued)

OTHER PUBLICATIONS

Brasilia S.p.A., PDM100 Spare Parts Catalog, Jan. 25, 2007, 35 pgs., Rev. No. 12, Retorbido, Italy.

*Primary Examiner* — Anthony Weier

(74) *Attorney, Agent, or Firm* — Sutherland Asbill & Brennan LLP

(57) ABSTRACT

A pod for mixing an amount of a dispersible material with water. The pod may include a pod body having a lower aperture and a poppet positioned within the aperture. The poppet may be sized so as to seal the lower aperture until a predetermined pressure is reached within the pod body.

28 Claims, 5 Drawing Sheets

U.S. PATENT DOCUMENTS

| | | | | |
|---|---|---|---|---|
| 4,860,645 | A | 8/1989 | van der Lijn et al. | |
| 4,886,674 | A | 12/1989 | Seward et al. | |
| 4,891,232 | A | 1/1990 | Dahl | |
| 4,941,399 | A | 7/1990 | Zucchetti | |
| 4,946,701 | A | 8/1990 | Tsai et al. | |
| 4,980,182 | A | 12/1990 | Kwon et al. | |
| 4,993,604 | A * | 2/1991 | Gaunt et al. | 222/481.5 |
| 4,995,310 | A | 2/1991 | van der Lijn et al. | |
| 4,995,978 | A | 2/1991 | Van de Gang | |
| 4,996,066 | A | 2/1991 | Love et al. | |
| 5,012,629 | A | 5/1991 | Rehman et al. | |
| 5,043,172 | A | 8/1991 | Loizzi | |
| 5,082,676 | A | 1/1992 | Love et al. | |
| 5,134,924 | A | 8/1992 | Vicker | |
| 5,135,764 | A | 8/1992 | Clausi et al. | |
| 5,190,652 | A | 3/1993 | van Thoor et al. | |
| 5,197,374 | A | 3/1993 | Fond | |
| 5,207,148 | A | 5/1993 | Anderson et al. | |
| 5,325,765 | A | 7/1994 | Sylvan et al. | |
| 5,343,799 | A | 9/1994 | Fond | |
| 5,347,916 | A | 9/1994 | Fond et al. | |
| 5,398,595 | A | 3/1995 | Fond et al. | |
| 5,398,596 | A | 3/1995 | Fond | |
| 5,402,707 | A | 4/1995 | Fond et al. | |
| 5,433,349 | A * | 7/1995 | Romanyszyn, Jr. | 222/129.2 |
| 5,433,962 | A | 7/1995 | Stipp | |
| 5,472,719 | A | 12/1995 | Favre | |
| 5,505,120 | A | 4/1996 | Albertson | |
| 5,554,400 | A | 9/1996 | Stipp | |
| 5,567,461 | A | 10/1996 | Lehrer | |
| 5,637,335 | A | 6/1997 | Fond et al. | |
| 5,638,741 | A | 6/1997 | Cisaria | |
| 5,656,311 | A | 8/1997 | Fond | |
| 5,721,005 | A | 2/1998 | Gutwein | |
| 5,733,591 | A | 3/1998 | Goerndt | |
| 5,741,538 | A | 4/1998 | Stipp et al. | |
| 5,840,189 | A | 11/1998 | Sylvan et al. | |
| 5,855,161 | A | 1/1999 | Cortese | |
| 5,895,672 | A | 4/1999 | Cooper | |
| 5,897,899 | A | 4/1999 | Fond | |
| 5,948,455 | A | 9/1999 | Schaefer et al. | |
| 5,992,298 | A | 11/1999 | Illy et al. | |
| 6,021,705 | A | 2/2000 | Dijs | |
| 6,079,315 | A | 6/2000 | Beaulieu et al. | |
| 6,082,247 | A | 7/2000 | Beaulieu | |
| 6,095,032 | A | 8/2000 | Barnett et al. | |
| 6,103,116 | A | 8/2000 | Koslow et al. | |
| 6,142,063 | A | 11/2000 | Beaulieu et al. | |
| 6,182,554 | B1 | 2/2001 | Beaulieu et al. | |
| 6,186,051 | B1 | 2/2001 | Aarts | |
| 6,399,126 | B1 | 6/2002 | Weldon | |
| 6,440,256 | B1 | 8/2002 | Gordon et al. | |
| 6,517,880 | B2 | 2/2003 | Walters, Jr. et al. | |
| 6,607,762 | B2 | 8/2003 | Lararis et al. | |
| 6,645,537 | B2 | 11/2003 | Sweeney et al. | |
| 6,740,345 | B2 | 5/2004 | Cai | |
| 6,758,130 | B2 | 7/2004 | Sargent et al. | |
| 6,759,072 | B1 | 7/2004 | Gutwein et al. | |
| 6,786,134 | B2 | 9/2004 | Green | |
| 6,869,627 | B2 | 3/2005 | Perkovic et al. | |
| 6,915,733 | B1 | 7/2005 | Langbauer | |
| 6,948,420 | B2 | 9/2005 | Kirschner et al. | |
| 7,032,504 | B2 | 4/2006 | Lee | |
| 7,097,074 | B2 | 8/2006 | Halliday et al. | |
| 7,210,401 | B1 | 5/2007 | Rolfes et al. | |
| 7,412,921 | B2 * | 8/2008 | Hu et al. | 99/295 |
| 2001/0052294 | A1 | 12/2001 | Schmed | |
| 2002/0059870 | A1 | 5/2002 | Walters, Jr. et al. | |
| 2003/0145736 | A1 | 8/2003 | Green | |
| 2005/0183578 | A1 | 8/2005 | Mandralis et al. | |
| 2005/0183581 | A1 | 8/2005 | Kirschner et al. | |
| 2005/0241489 | A1 | 11/2005 | Kirschner et al. | |
| 2006/0016344 | A1 * | 1/2006 | Kim et al. | 99/275 |
| 2006/0065127 | A1 | 3/2006 | Dalton et al. | |
| 2006/0110507 | A1 | 5/2006 | Yoakim | |
| 2006/0124659 | A1 | 6/2006 | Mosconi et al. | |
| 2006/0174770 | A1 * | 8/2006 | Jordana | 99/279 |
| 2006/0196363 | A1 | 9/2006 | Rahn | |
| 2006/0196364 | A1 | 9/2006 | Kirschner et al. | |
| 2007/0062375 | A1 | 3/2007 | Liverani | |
| 2008/0028946 | A1 * | 2/2008 | Kirschner et al. | 99/287 |

FOREIGN PATENT DOCUMENTS

| | | | | |
|---|---|---|---|---|
| EP | 0272922 | A2 | | 6/1988 |
| EP | 0361569 | | | 4/1990 |
| EP | 0398524 | A2 | | 11/1990 |
| EP | 0398530 | A2 | | 11/1990 |
| EP | 0780307 | A1 | | 10/1996 |
| EP | 0780310 | A1 | | 10/1996 |
| EP | 0780370 | A2 | | 10/1996 |
| EP | 0326099 | A1 | | 1/1998 |
| EP | 0844195 | A1 | | 5/1998 |
| EP | 0760222 | B1 | | 1/2000 |
| EP | 1042978 | A1 | | 4/2000 |
| EP | 0844195 | B1 | | 10/2001 |
| EP | 1243210 | | | 9/2002 |
| EP | 1440908 | A1 | | 7/2004 |
| EP | 1054610 | B1 | | 3/2005 |
| EP | 1566127 | A2 | | 8/2005 |
| EP | 1566127 | A3 | | 8/2005 |
| EP | 1579791 | A1 | | 9/2005 |
| EP | 1579792 | A1 | | 9/2005 |
| EP | 1580144 | A1 | | 9/2005 |
| EP | 1595817 | A1 | | 11/2005 |
| EP | 1629752 | A2 | | 3/2006 |
| EP | 1676786 | A2 | | 7/2006 |
| EP | 1700548 | A1 | | 9/2006 |
| EP | 1702543 | A2 | | 9/2006 |
| EP | 1710173 | A1 | | 10/2006 |
| EP | 1344722 | B1 | | 11/2006 |
| EP | 1654966 | B1 | | 12/2006 |
| EP | 1608569 | B1 | | 1/2007 |
| EP | 1767467 | A1 | | 3/2007 |
| EP | 1367924 | B1 | | 7/2007 |
| EP | 1580143 | B1 | | 11/2007 |
| FR | 757358 | | | 12/1933 |
| FR | 2213757 | | | 8/1974 |
| FR | 2617389 | A1 | | 6/1987 |
| GB | 803486 | | | 1/1956 |
| GB | 2174375 | | * | 11/1986 |
| JP | 01297114 | | | 11/1989 |
| JP | 02-289207 | | | 11/1990 |
| JP | 03-010902 | Y | | 3/1991 |
| JP | 05-030674 | Y | | 8/1993 |
| JP | 06-315437 | | | 11/1994 |
| JP | 3244777 | B | | 1/2002 |
| JP | 2005-199071 | A | | 7/2005 |
| JP | 2006-513790 | A | | 4/2006 |
| JP | 3827079 | | | 9/2006 |
| JP | 2007-068498 | A | | 3/2007 |
| WO | 9317932 | | | 3/1992 |
| WO | 95-07648 | | | 3/1995 |
| WO | 9823196 | | | 11/1996 |
| WO | 99-58035 | | | 11/1999 |
| WO | 0160220 | A1 | | 2/2001 |
| WO | 0160712 | A1 | | 2/2001 |
| WO | 02-074143 | | | 9/2002 |
| WO | 03-065859 | | | 8/2003 |
| WO | 2004-083071 | A1 | | 9/2004 |
| WO | 2004-087529 | A1 | | 10/2004 |
| WO | 2005-016094 | A1 | | 2/2005 |
| WO | 2006-014319 | A2 | | 2/2006 |
| WO | 2006-014936 | A2 | | 2/2006 |
| WO | 2006-016813 | A2 | | 2/2006 |
| WO | 2006-016814 | A2 | | 2/2006 |
| WO | 2006-021405 | A2 | | 3/2006 |
| WO | 2006-029109 | | | 3/2006 |
| WO | 2006-043096 | A1 | | 4/2006 |
| WO | 2006-043106 | A2 | | 4/2006 |
| WO | 2006-043108 | A1 | | 4/2006 |
| WO | 2006-057022 | A1 | | 6/2006 |
| WO | 2006-061494 | A1 | | 6/2006 |
| WO | 2006-069801 | A1 | | 7/2006 |
| WO | 2006-121520 | | | 11/2006 |
| WO | 2007-001579 | | | 1/2007 |

* cited by examiner

POD FOR DISPERSIBLE MATERIALS

FIELD

The present application relates generally to a container for dispersible materials and more particularly relates to a pod for use in the mixing of teas, chocolate, infusions, and other types of dispersible materials.

BACKGROUND OF THE INVENTION

Various types of automatic beverage dispensers are known. Generally described, these dispensers hold a measure of dispersible materials in a container of some sort. Hot water typically is added to the materials so as to mix the beverage. One drawback with these known beverage dispensers is that the elements of the dispenser that come in contact with the dispersible materials must be cleaned and/or sanitized on a periodic basis. Further, dispersible materials generally require a significant amount of work to properly mix the beverage. As a result the beverage dispenser as a whole may be somewhat slow between beverage cycles.

There is a desire, therefore, for a beverage dispenser and associated components that mixes a beverage with a relatively quick cycle time. The beverage dispenser preferably should be relatively inexpensive and easy to use while consistently producing a high quality beverage. Likewise, the beverage dispenser preferably should be easily adaptable for different types and amounts of dispersible materials and other ingredients.

SUMMARY OF THE INVENTION

The present application thus describes a pod for mixing an amount of a dispersible material with water. The pod may include a pod body having a lower aperture and a poppet positioned within the aperture. The poppet may be sized so as to seal the lower aperture until a predetermined pressure is reached within the pod body.

The pod body may include a circular sidewall and a conical base. The circular sidewall may include a smooth interior surface. The pod body may include a deflector skirt. The pod body may include a substantially rigid material. The pod further may include a lid positioned within the pod body. The lid may include a number of orifices therein. The orifices may include a diameter of about 0.38 millimeters (about 0.015 inches).

The poppet may include a lower base, an upper base, and a column. The aperture may include a predetermined diameter and the upper base may include an upper base diameter that is slightly larger than the predetermined diameter such that the upper base fits snuggly within the aperture. The lower base may include a lower base diameter larger than the upper base diameter. The poppet may include a number of ribs positioned on the column. The ribs may include a rib diameter greater than the predetermined diameter. The predetermined pressure may include about 0.4 kilograms per square centimeter (about 6 psi).

The pod body may include a ring positioned about the aperture. The pod body and poppet may form a locking mechanism. The locking mechanism includes a tortuous flow path therethrough. The pod body may include a pair of flanges such that the flanges define a cutout. The flanges also may include a boss. The poppet may include a locking flange that is sized to fit within the cutout for locking therewith. The poppet may include a rib section and a plug section. The pair of flanges may include a number of catches. The poppet may include a band positioned about the locking flange. The pod body may include a number of internal barriers.

The present application further describes a pod for holding an amount of a dispersible material. The pod may include a pod body with an aperture therein, a poppet positioned sealing the aperture, and a locking mechanism. The locking mechanism maintains the poppet sealing within the aperture until a predetermined pressure is reached within the pod body.

The locking mechanism forms a tortuous flow path therethrough. The locking mechanism may include a pair of flanges positioned on the pod body such that the flanges define a cutout. The locking mechanism may include a locking flange positioned on the poppet that is sized to fit within the cutout for locking therewith. The pod poppet may include a rib section and a plug section. The locking mechanism may include a pair of catches. The pod body may include a number of internal barriers.

The present application further may describe a method of mixing a beverage within a pod having a lid and a poppet valve. The method may include the steps of flowing water through the lid, mixing the beverage within the pod, developing pressure within the pod, releasing the poppet valve when the pressure reaches a predetermined level, and flowing the beverage out of the pod.

The present application further describes a pod for holding an amount of a dispersible material. The pod may include a pod body, an impeller device positioned therein, and a lid.

The impeller device may include a number of impellers. The impellers may include a number of blades. The lid may include a number of orifices therein. The pod body may include a score line therein.

These and other features of the present application will become apparent to one of ordinary skill in the art upon review of the following detailed description of the preferred embodiments when taken in conjunction with the drawings and the appended claims.

DETAILED DESCRIPTION

Figure 1:
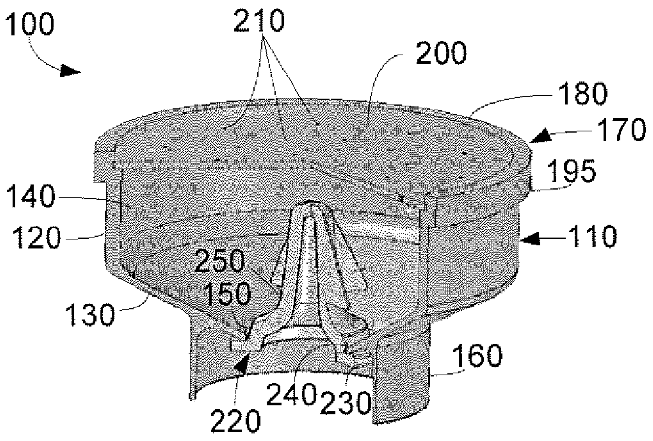
FIG. 1 is a perspective view of a poppet pod as is described herein.
Figure 2:
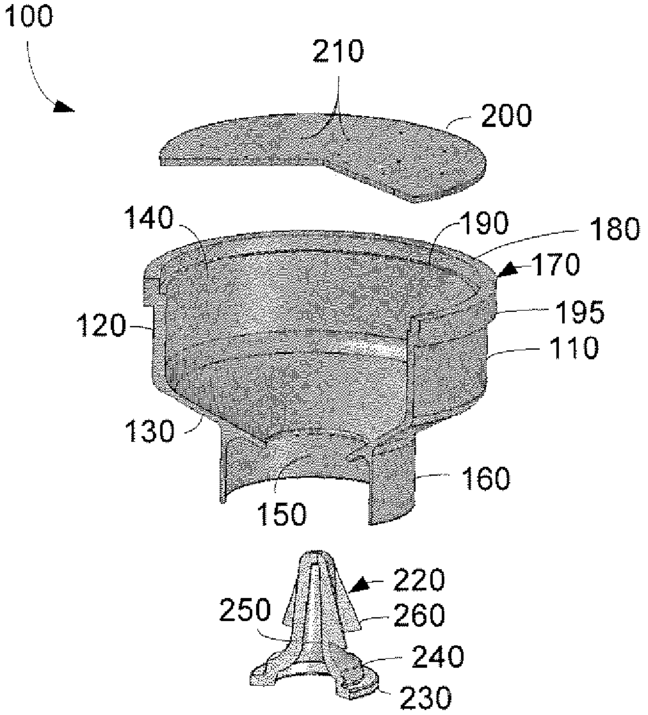
FIG. 2 is an exploded view of the poppet pod of FIG. 1.

Referring now to the drawings, in which like numerals refer to like elements throughout the several views, FIGS. 1 and 2 show a poppet pod 100 as is described herein. The poppet pod 100, and the elements thereof may be made out of a conventional thermoplastic such as polystyrene, polypropylene, polyethylene, and similar types of materials. Alternatively, stainless steel, glass, or other types of substantially non-corrosive materials also may be used.

The poppet pod 100 includes a poppet body 110. The poppet body 110 may have a substantially circular sidewall 120 that leads to a conical base 130. The sidewall 120 and the conical base 130 define an interior surface 140. The interior surface 140 may be substantially smooth and crevice free so as to avoid trapping materials therein and to ensure complete evacuation of the liquid therein. The sidewall 120 may have an inside diameter of about 38 millimeters (about 1.5 inches) with a wall thickness of about one (1) millimeter (about 0.04 inches). The conical base 130 may extend downward at about forty-five degrees (45°) from the sidewall 120. The conical base 130 may have a depth of about 15.8 millimeters (about 0.6 inches) and a wall thickness of about 0.75 to about 1.5 millimeters (about 0.03 to about 0.06 inches). The sidewall 120 and the conical base 130 may take any convenient size or shape.

The conical base 130 further may have an outlet aperture 150 formed therein. The outlet aperture 150 preferably is positioned about the center of the conical base 130. The outlet aperture 150 may have a diameter of about 12.7 millimeters (about one half inch). Any convenient size or shape may be used.

Positioned about the conical base 130 may be a deflector skirt 160. The deflector skirt 160 may be largely circular in shape and may extend from the conical base 130 by about eight (8) to about nine (9) millimeters (about 0.3 to about 0.35 inches). Any convenient size or shape may be used herein. The base 130 and the skirt 160 may be a single element or separate elements.

The sidewall 120 also may include a lip 170. The lip 170 may include a substantially flat top portion 180. The lip 170 may be offset from the sidewall 120 somewhat so as to provide an inner ledge 190. The inner ledge 190 will be used with a lid as is described below. The lip 170 also may extend beyond the outside diameter of the sidewall 120 into a flange 195 by about 1.2 to about 1.3 millimeters (about 0.047 to about 0.05 inches). The flange 195 may be used to support the pod 100 in a beverage dispenser or other type of device. Any convenient size or shape may be used herein.

The poppet body 110 may be substantially rigid so as to withstand the heat and pressure of the typical beverage cycle without imparting an off taste. By the term "rigid", however, we mean that the poppet body 110 may flex or deform slightly while under pressure. The poppet body 110 may withstand temperatures of over about 95 degrees Celsius (about 203 degrees Fahrenheit) for up to about thirty (30) seconds or more at a hydraulic pressure of over about eleven (11) bar. Although the poppet body 110 may flex or deform somewhat the pod body 110 as a whole should withstand the expected water pressure therethrough.

Positioned with the inner edge 190 of the poppet body 110 may be a lid 200. The lid 200 may have a thickness of about 0.7 to about 0.8 millimeters (about 0.027 to about 0.03 inches). The lid 200 may include a number of orifices 210 positioned therein. The orifices 210 may have a diameter of about 0.38 millimeters (about 0.015 inches) or so. About twenty-five (25) orifices 210 may be used. Any number or size of the orifices 210 may be used herein. The orifices 210 may be sized and positioned so as to create a series of high-speed water jets.

Positioned within the outlet aperture 150 of the poppet body 110 may be a poppet valve or a poppet 220. The poppet 220 may include a lower base 230, an upper base 240, a central column 250, and a number of ribs 260. The upper base 240 fits relatively snuggly within the outlet aperture 150 of the poppet body 110. As such, the upper base 240 has a diameter that is slightly larger than the diameter of the aperture 150. The lower base 230 has an even larger outside diameter so as to direct the flow of fluid along the outlet aperture 150 and the upper base 240. The central column 250 rises from the upper base 240. The central column 250 may have a height larger than that of the expected amount of material to be positioned within the poppet body 110 so as to ensure that no dispersible material remains on top of the column 250. The ribs 260 may have a width larger than that of the outer aperture 150 so as to allow the insertion of the poppet 220 in the outlet aperture 250 while preventing the poppet 220 from being removed. Any number of ribs 260 may be used. The poppet 220 should remain in place within the outlet aperture 150 until a predetermined pressure is reached, in this case about 0.4 kilograms per square centimeter (about 6 psi) of pressure is applied thereto. The pressure required to release the poppet 220 may be varied based upon the relationship between the diameter of the aperture 150 and the upper base 240 and other factors.

Figure 3:
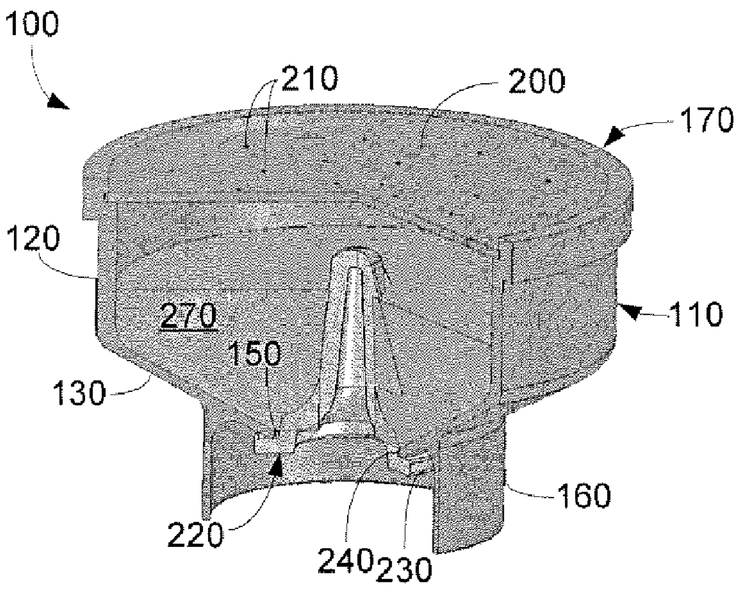
FIG. 3 is a side cross-sectional view of the poppet pod of FIG. 1 with a dispersible material therein.

As is shown in FIG. 3, the poppet 220 is positioned within the outlet aperture 150 of the poppet body 110. An amount of a dispersible material 270 is positioned within the inner surface 140 of the poppet body 110. The lid 200 is then positioned within the inner edge 190 of the sidewall 120. The poppet body 110 then may be transported and stored as desired. While mixing, the poppet body 110 may be subject to pressurized water flow at about 10 to about 14 bar (about 145 to 200 psi). The pressurized water thus travels through the orifices 210 within the lid 200. The pressurized water may travel at about 55 meters per second (about 10 feet per second). The orifices 210 thus create a series of high speed water jets so as to promote good mixing of the dispersible material 270 as the water passes therethrough. An example of a beverage dispenser for use with the pod 100 is shown in commonly owned U.S. Pat. No. 6,786,134, entitled "Coffee and Tea Dispenser". U.S. Pat. No. 6,786,134 is incorporated herein by reference.

Figure 4:
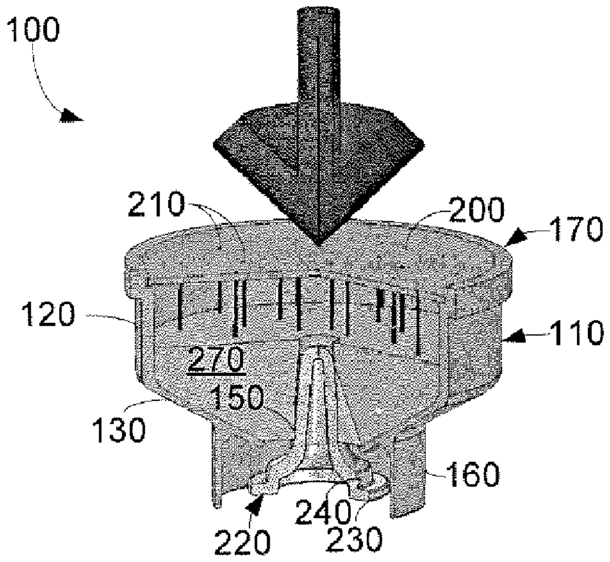
FIG. 4 is a side cross-sectional view of the poppet pod of FIG. 1 with the poppet descending.
Figure 5:
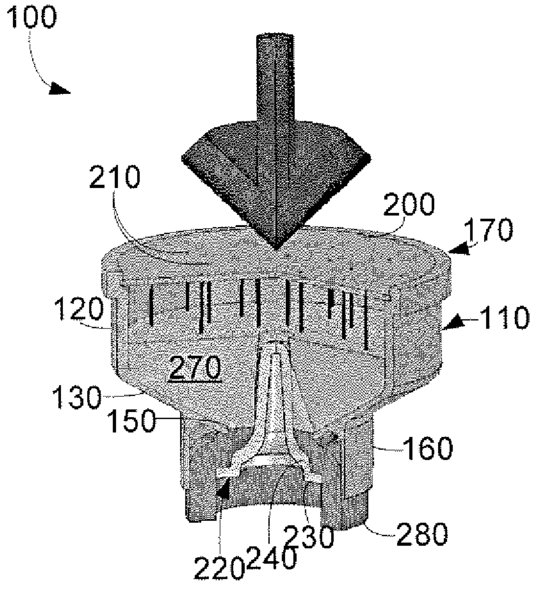
FIG. 5 is a side cross-sectional view of the poppet pod of FIG. 1 with the poppet descended and the dispersible liquid flowing out.

As is shown in FIGS. 4 and 5, the water thus travels through the dispersible material 270 so as to mix a beverage 280. When the pressure in the pod 100 reaches the release pressure on the poppet 220, the upper base 240 separates from the outlet aperture 150 and the poppet 220 descends downward until the ribs 260 contact the interior surface 140 of the conical base 130. The beverage 280 thus may flow out of the outer aperture 150 onto the lower base 230 and then out within the skirt 160. The respective sizes of the poppet 220 as a whole with respect to the aperture 150 provides a shearing force to the beverage 280 as it passes therethrough so as to promote mixing. Likewise, the lower base 230 and the skirt 160 create a turbulent fluid flow so as to promote further good mixing. The pod 110 then may be disposed of or reused as desired.

The nature of the water flow through the pod 110 as a whole depends in part upon the geometry and size of the pod 100, the nature, size, and density of the dispersible material 270, the water pressure, the water temperature, the mixing time, and other parameters. Altering any of the parameters may alter the nature of the beverage 280. The dispersible material 270 may take the form of green tealeaves, chocolate, infusions, or other types of materials that generally dissolve in water or other types of liquid. Further, the dispersible material 270 may be a liquid as well. Any type of other materials also may be used herein.

Figure 6:
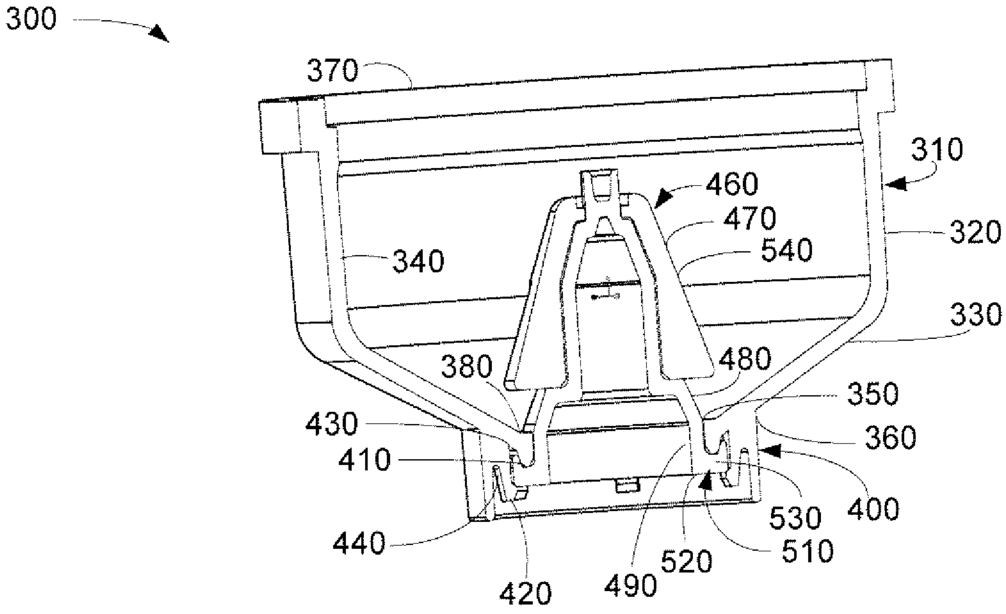
FIG. 6 is a side cross-sectional view of an alternative embodiment of a poppet pod as is described herein.
Figure 7:
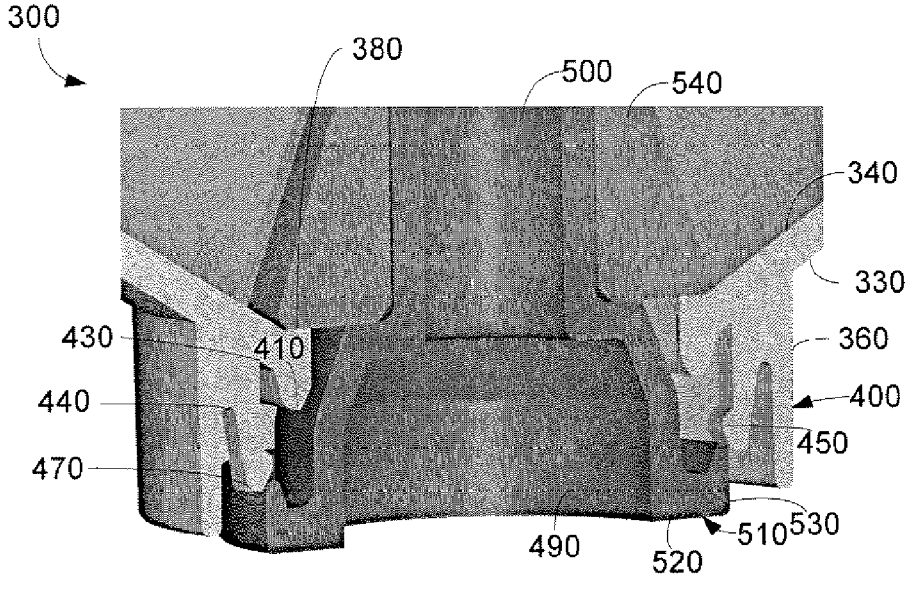
FIG. 7 is a side cross-sectional view of the poppet pod of FIG. 6.

FIGS. 6 and 7 show an alternative embodiment of a poppet pod 300 as is described herein. Similar to the poppet pod 100 described above, the poppet pot 300 includes a poppet body 310 with a substantially circular sidewall 320 and a conical base 330. The sidewall 320 and the base 330 define an interior surface 340. The conical base 330 further includes an outlet aperture 350 formed therein. A deflector skirt 360 may be positioned about the conical base 330. A lid 370 may enclose the pod body 310.

In the present embodiment, the conical base 330 of the poppet body 310 may lead to an outlet ring 380. The outlet ring 380 may be largely flat and at a substantially horizontal position. The outlet ring 380 may encircle the aperture 350.

Positioned beneath the circular base 330 and the outlet ring 380 may be a locking mechanism 400. In this embodiment, the locking mechanism 400 may include a pair of flanges, an upper flange 410 and a lower flange 420, as well as the elements as described below. (Although the term "flange" is used herein, it will be appreciated that flanges 410, 420 are shown in cross-section such that the flanges 410, 420 are in fact largely circular and extend around the diameter of the aperture 350 in whole or in part.) The upper flange 410 defines a first undercut 430. The first uppercut 430 extends between the upper flange 410 and the lower flange 420. The lower flange 420 defines a second uppercut 440. The second uppercut 440 extends between the lower flange 420 and the skirt 360. The lower flange 420 also may include a boss 450 at one end thereof.

The locking mechanism 400 preferably is a unitary element as formed by molding or similar techniques. Alternatively, certain elements may be made separately and attached thereto. For example, the boss 450 may be made out of material different than that of the remainder of the locking mechanism 400. In this example, the boss 450 may be made out of PPE (a Phenylene Ether Co-polymer) while the remainder of the locking mechanism 400 may be made out of polypropylene. A number of ribs (not shown) also may be used with the locking mechanism 400 within the width of the aperture 350.

The poppet pod 300 further includes a poppet 460. In this embodiment, the poppet 460 is a two-part element with an upper rib section 470 and a lower plug section 480. The plug section 480 includes a base portion 490 and a central column 500. The base portion 490 is largely circular in shape and fits snuggly within the aperture 350 of the pod body 310. The base 490 further includes a locking flange 510. The locking flange 510 includes an extended horizontal element 520 that leads to a vertical element 530. The vertical element 530 is sized to fit snuggly within the first uppercut 430 of the pod body 310 and rests on top of the boss 450. The locking flange 510 may be a continuous circle or may be interrupted so as to form a number of catches as described below. The column 500 extends upward into the pod body 310. The rib section 470 is then positioned on the column 500. The rib section 470 includes a number of ribs 540. The ribs 540 have a diameter greater than that of the aperture 350. Any number of ribs 540 may be used herein. When in the dispensing position, the ribs 540 rest on the flat ring 380 of the pod body 310.

In use, the plug section 480 is positioned within the aperture 350 and is held in place via the locking mechanism 400. Specifically, the vertical element 530 is locked within the first uppercut 430 and the boss 450. The base 490 of the plug section 480 aligns with the aperture 350 so as to seal the aperture 350. The rib section 470 then may be positioned on the column 500 of the plug section 480. An amount of the disbursement materials 270 then may be positioned within the pod body 310. The lid 370 then may be positioned within the pod body 310 such that the poppet pod 300 then may be transported and stored as desired.

To produce the beverage 280, hot water is added to the poppet pod 300 via the orifices 380 within the lid 370. As above, the orifices 380 act as high speed water jets so as to promote good mixing of the water and the dispersible materials 270. The pressure building within the pod 300 causes mixing of the water and the dispersible materials 270. Once the release point of the locking mechanism 400 is met, the lower flange 420 of flexes outward so as to permit the poppet 460 to descend uniformly within the aperture 350. Further mixing of the water and the dispersible materials 270 occurs as the beverage 280 is forced through the aperture 350 and along the base 490 of the plug section 480 of the poppet 460. This structure also forms a tortuous flow path therethrough. Likewise, mixing takes place as the beverage 280 escapes from the base 490 of the poppet 460 and is forced against the skirt 360.

Alternatively, a number of different dispersible materials 270 may be positioned within the pod body 310. Further, the different materials 270 may be layered or vertically separated within the pod body 310. A number of internal barriers may be positioned within the pod body 310 to keep the different materials 270 separated if desired.

Figure 8:
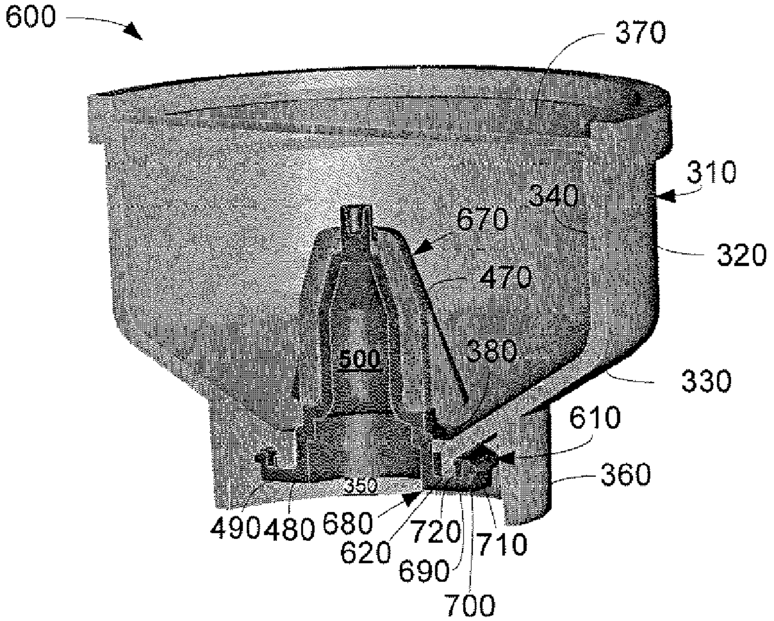
FIG. 8 is an exploded view of an alternative embodiment of a pod as is described herein.
Figure 9:
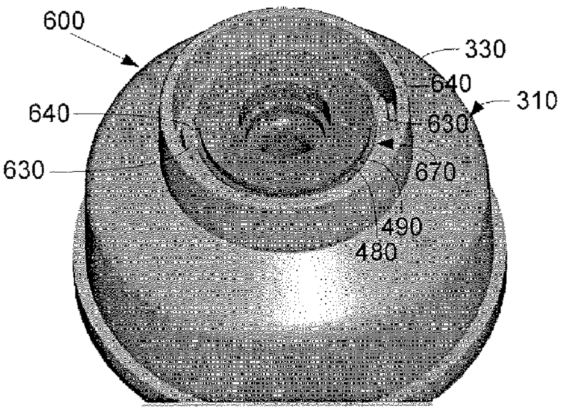
FIG. 9 is a perspective view of an alternative embodiment of a poppet pod as described herein.
Figure 10:
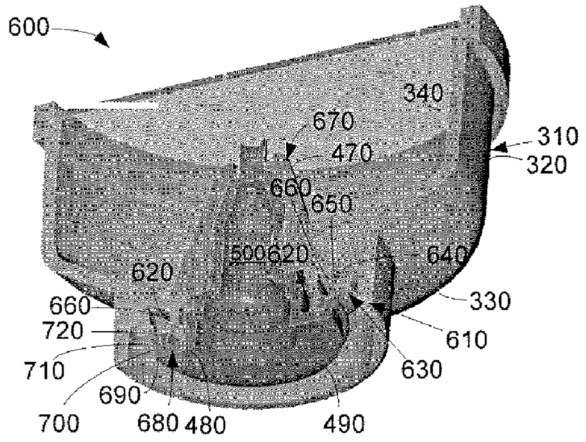
FIG. 10 is a side cross-sectional view of the poppet pod of FIG. 9.

FIGS. 8-10 show an alternative embodiment of a poppet pod 600 as is described herein. Similarly to the poppet pod 100 described above, the poppet pod 600 includes the poppet body 310 with the substantially circular sidewall 320 and the conical base 330. The sidewall 320 and the base 330 define the interior surface 340. The conical base 330 further includes the outer aperture 350 formed therein. The deflector skirt 360 may be positioned about the conical base 300. The lid 370 may enclose the pod body 310. The conical base 330 of the poppet body may lead to the outlet ring 380. The outlet ring may be largely flat and at a substantially horizontal position. The outlet ring 380 may encircle the aperture 350.

Positioned beneath the circular base 330 and the outlet ring 380 may be a locking mechanism 610. The locking mechanism 610 may include a first flange 620 that encircles the aperture 350 as well as the elements described below. In this embodiment, the locking mechanism 610 includes a pair of catches 630. The catches 630 may be on opposite sides of the poppet pod 600. The catches 630 include an elongated flange 640 similar to the second flange 420 described above. The elongated flange 640 may have a boss 650 at one end thereof. The first flange 620 and the elongated flange 640 define a catch undercut 660.

The poppet pod 600 further includes a poppet 670. As above, the poppet 670 is a two part element with the upper rib section 470 and the lower plug section 480. The plug section 480 includes the base portion 490 and the central column 500. The base portion 490 is largely circular in shape and fits snuggly in the aperture 350 of the pod body 310. The base 490 further includes a locking flange 680. Similar to the locking flange 510 described above, the locking flange 680 includes an extended horizontal element 690 that leads to a vertical element 700. The vertical element 700 further may end in a boss 710. A band 720 may be positioned within the locking flange 680. The band 720 may be of elastomeric material so as to promote a snug fit and easy removal from the catch undercut 660.

As above, the central column 500 extends upwards within the pod body 310. The rib section 470 is then positioned on the column 500. The rib section 470 may include a number of ribs 540. In this example, two ribs 540 are used. Any number of ribs 540, however, may be used herein. The ribs 540 have a diameter greater than that of the aperture 350. When in a dispensing position, the ribs 540 rest on the outlet ring 380 of the pod body 310.

In use, the plug section 480 is positioned within the aperture 350 and is held in place via the locking mechanism 610. Specifically, the boss 710 of the vertical element 700 of the locking flange 680 is caught within the catch 630. The base 490 of the plug section 480 this is locked via the locking mechanism 610 so as to seal the aperture 350. The rib section 470 then may be positioned on the column 500. An amount of the disbursement materials 270 then may be positioned over the pod body 310. The lid 370 then may be positioned within the pod body such that the poppet pod 600 then may be transported and stored as desired.

To produce a beverage 280, hot water is added to the poppet pod 600 via the orifices 380 within the lid 370. As above, the orifices 380 act as high speed water jets so as to promote good mixing of the water and the disbursable materials 270. The pressure within the pod 600 causes the mixing of the water and disbursable materials 270. Once the release point of the locking mechanism 610 is met, the catches 630 flex outward so as to permit the poppet 670 to descend uniformly within the aperture 350. Further mixing of the water and the disbursable materials 270 occurs as the beverage 280 is forced through the aperture 350 and along the base 490 of the plug section 480 of the poppet 670.

Figure 11:
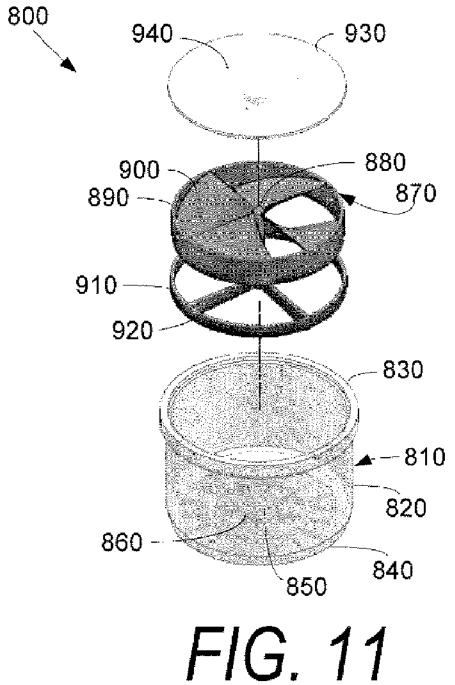
FIG. 11 is an exploded view of an alternative embodiment of a pod as is described herein.
Figure 3:
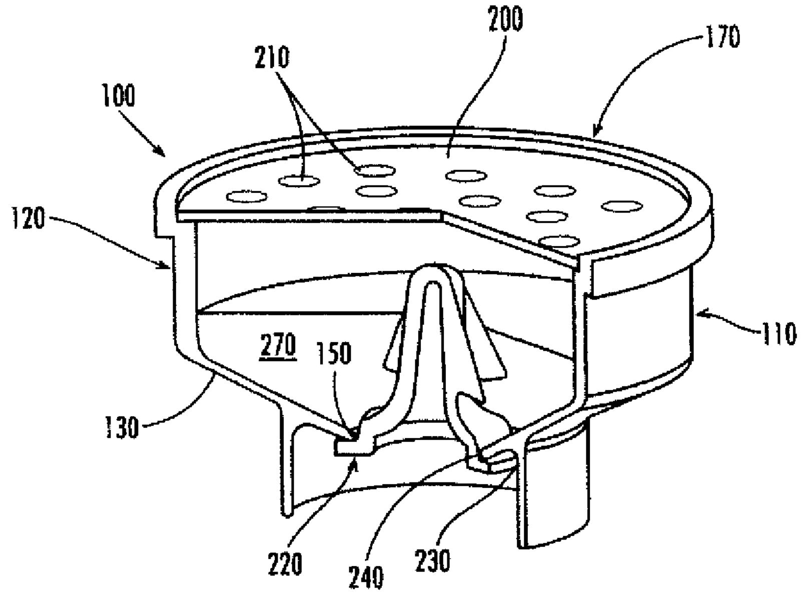
Figure 4:
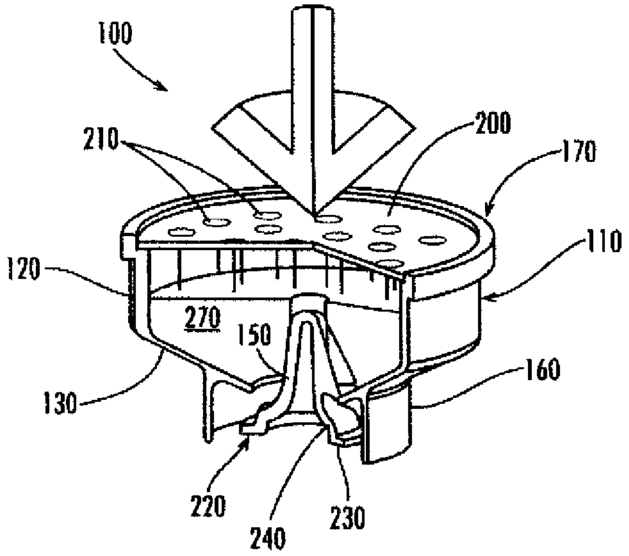
Figure 5:
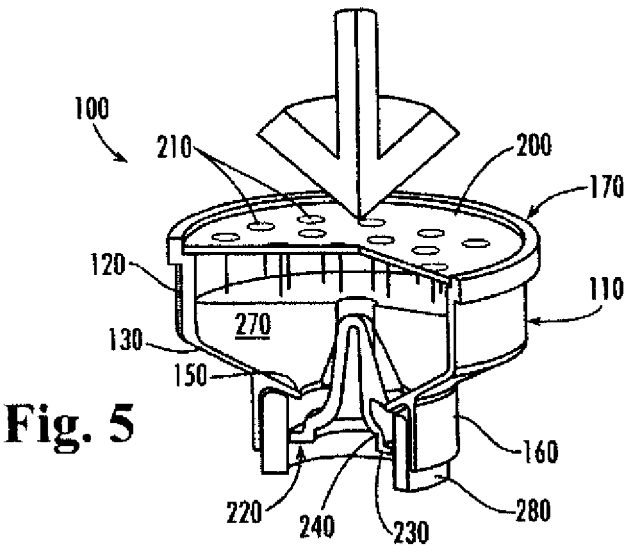
Figure 6:
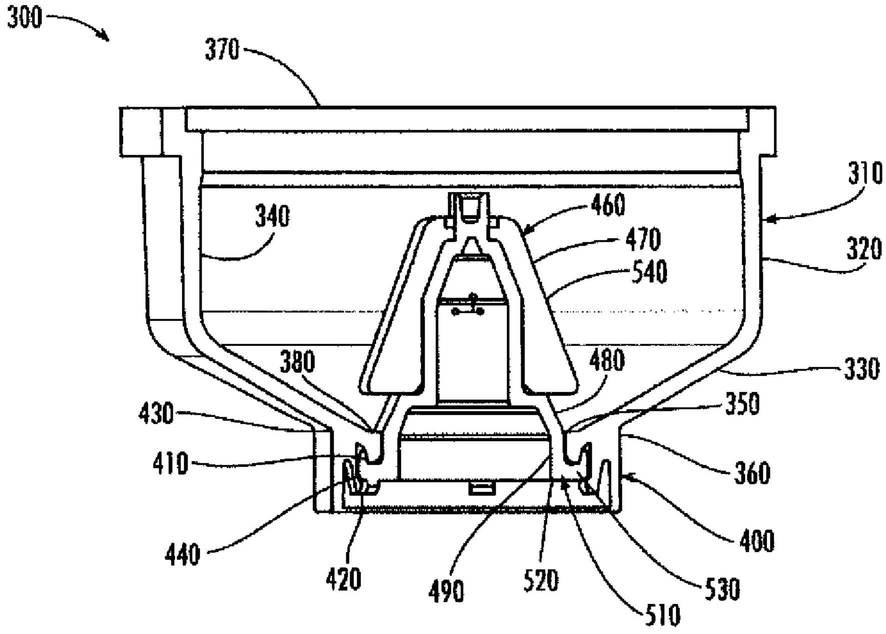
Figure 7:
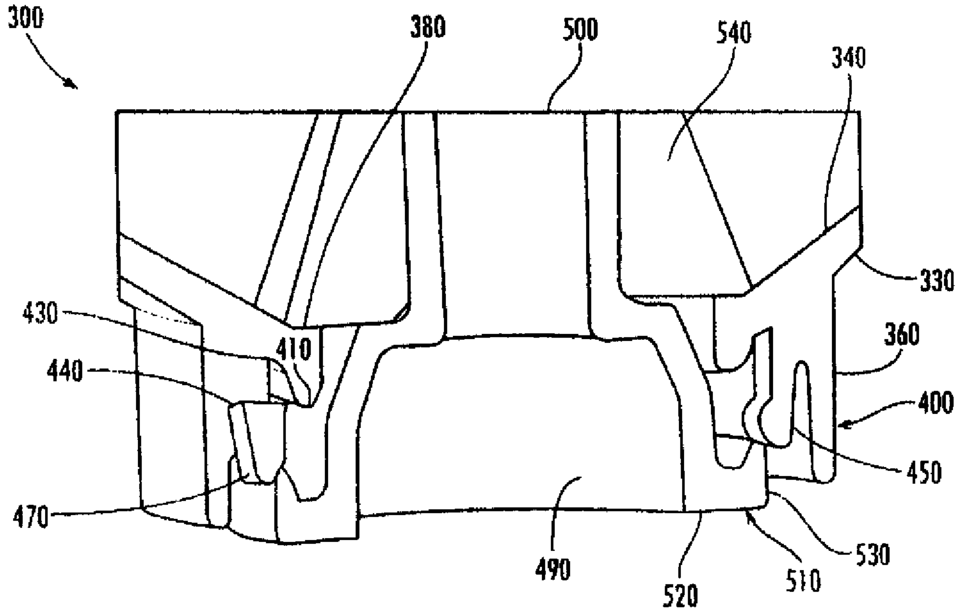
Figure 8:
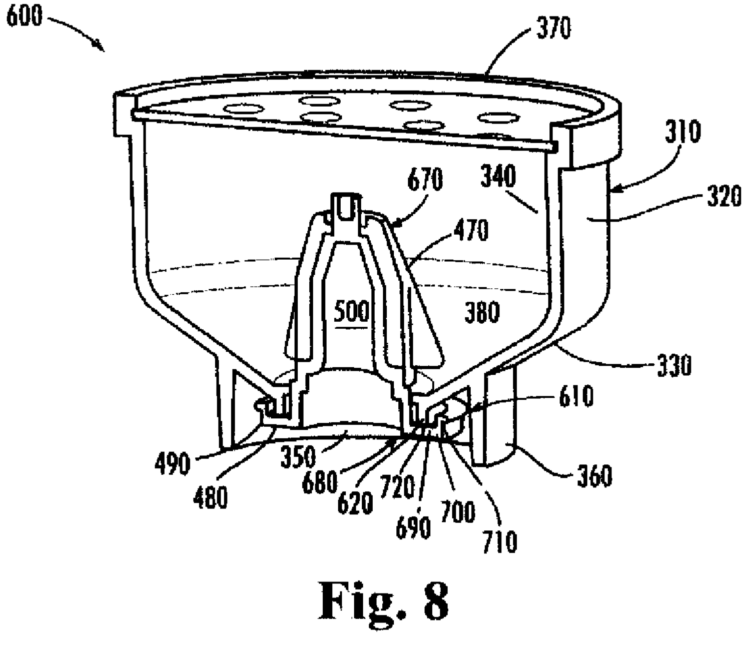
Figure 9:
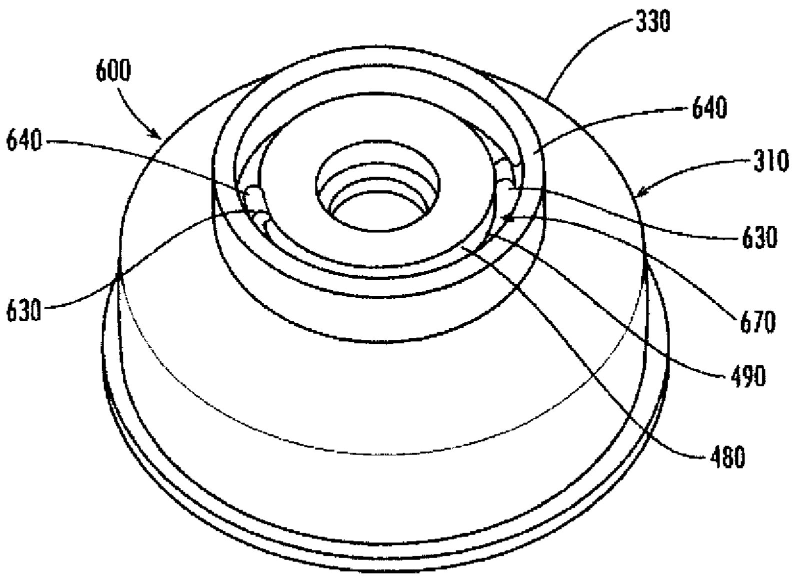
Figure 10:
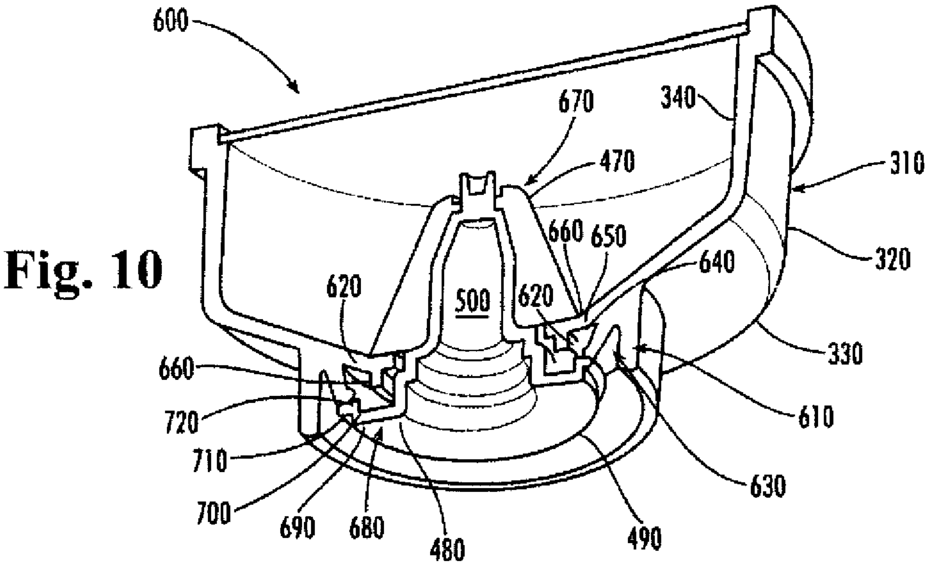
Figure 11:
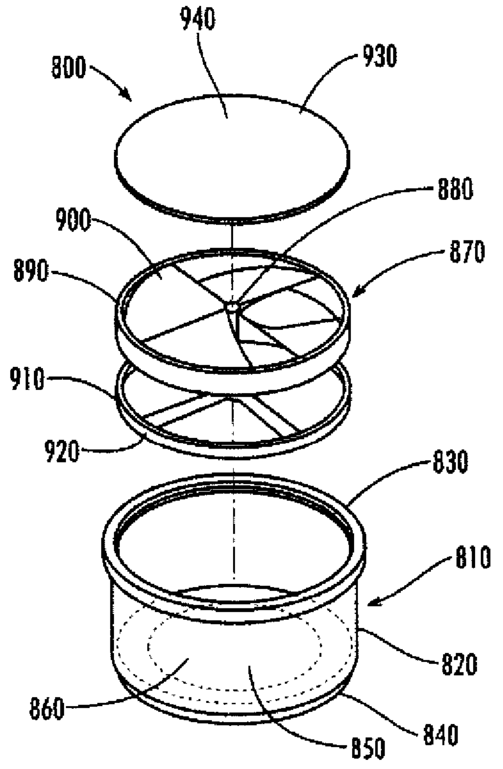

FIG. 11 shows a further embodiment of a pod 800 as is described herein. The pod 800 includes a pod body 810. In this example, the pod body 810 is largely similar to that shown in commonly owned U.S. Pat. No. 6,948,420 and U.S. patent application Ser. No. 10/908,350, both entitled "Coffee and Tea Pod". U.S. Pat. No. 6,948,420 and U.S. patent application Ser. No. 10/908,350 are incorporated herein by reference. Specifically, the pod body 810 includes a circular sidewall 820 with an extended lip 830. The pod body 810 also includes a relatively flat base 840. The base 840 may include a central indent 850. The base 840 further may include one or more score lines 860. The score line 860 is a line of weakening within the material of the base 840. The score line 860 is intended to open once in contact with hot water and/or a predetermined measure of water pressure.

Positioned within the pod body 810 may be an impeller unit 870. The impeller unit 870 includes a central shaft 880. The shaft 880 is positioned within the indent 850 for rotation therewith. A top impeller 890 is positioned on the shaft 880. The top impeller 890 may have a number of blades 900 connected to the shaft 880. Likewise, a bottom impeller 910 may be connected to the shaft 880. The bottom impeller 910 includes a number of mixing blades 920 connected to the shaft 780. The mixing blades 920 may be relatively narrow as compared to the blades 900.

The pod body 810 may be enclosed by a lid 930. The lid 930 may have a number of orifices 940 positioned therein. In this example, three (3) orifices 940 may be used. The orifices 940 may be positioned out of phase with the blades 900 of the top impeller 890 such that at least one stream will contact the blades 900 in the correct position to begin rotation.

In use, water is forced through the orifices 940 of the lid 930. The orifices 940 create about eight (8) bars of pressure. The pressure may be varied. The orifices 940 direct the water streams towards the impeller unit 870. The water stream thus causes the impeller unit 870 to begin rotating. The top impeller 890 acts largely like a turbine once the water jets begin striking the blades 900. Likewise, the bottom impeller 910 causes mixing of the water and the dispersible material 270 with the mixing blades 920. As the pressure develops within the pod body 810, the score line 860 is breached thus allowing the beverage 280 to exit the pod. The use of the water jets and the impeller unit 870 thus promotes good mixing of the water and the dispersible material 270.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A pod for mixing an amount of a dispersible material with water, comprising:
a pod body;
the pod body comprising an aperture therein; and
a poppet positioned within the aperture;
the poppet sized so as to seal the aperture until a predetermined pressure is reached within the pod body; and
wherein the pod body and poppet comprise a locking mechanism with a tortuous flow path therethrough.

2. The pod of claim 1, wherein the pod body comprises a circular sidewall and a conical base.

3. The pod of claim 2, wherein the circular sidewall comprises a smooth interior surface.

4. The pod of claim 1, wherein the pod body comprises a deflector skirt.

5. The pod of claim 1, wherein the pod body comprises a substantially rigid material.

6. The pod of claim 1, further comprising a lid positioned within the pod body.

7. The pod of claim 6, wherein the lid comprises a plurality of orifices therein.

8. The pod of claim 7, wherein the plurality of orifices comprises a diameter of about 0.38 millimeters (about 0.015 inches).

9. The pod of claim 1, wherein the poppet comprises a lower base, an upper base, and a column.

10. The pod of claim 9, wherein the aperture comprises a predetermined diameter and wherein the upper base comprises an upper base diameter slightly larger than the predetermined diameter such that the upper base fits snuggly within the aperture.

11. The pod of claim 10, wherein the lower base comprises a lower base diameter larger than the upper base diameter.

12. The pod of claim 10, wherein the poppet comprises a plurality of ribs positioned on the column.

13. The pod of claim 12, wherein the plurality of ribs comprises a rib diameter greater than the predetermined diameter.

14. The pod of claim 1, wherein the predetermined pressure comprises about 0.4 kilograms per square centimeter (about 6 psi).

15. The pod of claim 1, wherein the pod body comprises a ring positioned about the aperture.

16. The pod of claim 1, wherein the pod body comprises a pair of flanges and wherein the pair of flanges defines a cutout.

17. The pod of claim 16, wherein the pair of flanges comprises a boss.

18. The pod of claim 16, wherein the poppet comprises a locking flange and wherein the locking flange is sized to fit within the cutout for locking therewith.

19. The pod of claim 1, wherein the poppet comprises a rib section and a plug section.

20. The pod of claim 16, wherein the pair of flanges comprise a plurality of catches.

21. The pod of claim 18, wherein the poppet comprises a band positioned about the locking flange.

22. The pod of claim 1, wherein the pod body comprises a plurality of internal barriers.

23. A pod for holding an amount of a dispersible material, comprising:

a pod body;

the pod body comprising an aperture therein;

a poppet sealing the aperture; and a locking mechanism;

wherein the locking mechanism maintains the poppet sealing the aperture until a predetermined pressure is reached within the pod body; and wherein the locking mechanism comprises a pair of catches.

24. The pod of claim 23, wherein the locking mechanism comprises a tortuous flow path therethrough.

25. The pod of claim 23, wherein the locking mechanism comprises a pair of flanges positioned on the pod body and wherein the pair of flanges defines a cutout.

26. The pod of claim 25, wherein the locking mechanism comprises a locking flange positioned on the poppet and wherein the locking flange is sized to fit within the cutout for locking therewith.

27. The pod of claim 25, wherein the poppet comprises a rib section and a plug section.

28. The pod of claim 23, wherein the pod body comprises a plurality of internal barriers.

* * * * *

UNITED STATES PATENT AND TRADEMARK OFFICE

CERTIFICATE OF CORRECTION

PATENT NO. : 7,947,316 B2
APPLICATION NO. : 11/462444
DATED : May 24, 2011
INVENTOR(S) : Jonathan Kirschner et al.

It is certified that error appears in the above-identified patent and that said Letters Patent is hereby corrected as shown below:

Please delete the title page showing an illustrative figure and substitute therefor the attached title page Delete drawing sheets 1 - 5 and insert drawing sheets 1 - 6 consisting of figures 1 - 11 as attached Signed and Sealed this
Twenty-third Day of August, 2011

David J. Kappos
*Director of the United States Patent and Trademark Office*

(12) United States Patent
Kirschner et al.

(10) Patent No.: US 7,947,316 B2
(45) Date of Patent: May 24, 2011

(54) POD FOR DISPERSIBLE MATERIALS

(75) Inventors: Jonathan Kirschner, Powder Springs, GA (US); Paul A. Phillips, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 1306 days.

(21) Appl. No.: 11/462,444

(22) Filed: Aug. 4, 2006

(65) Prior Publication Data

US 2008/0028948 A1 Feb. 7, 2008

(51) Int. Cl.
*A47J 31/06* (2006.01)

(52) U.S. Cl. ............... 426/77; 426/426; 99/275; 99/295

(58) Field of Classification Search .................... 426/77, 426/426; 99/275, 295
See application file for complete search history.

(56) References Cited

U.S. PATENT DOCUMENTS 1,951,357 A 3/1934 Hall
2,589,783 A * 3/1952 Crossley et al. ............... 99/295
2,743,664 A 5/1956 Dale
2,778,739 A 1/1957 Rodth
2,968,560 A 1/1961 Goros
3,151,418 A 10/1964 Powell et al.
3,269,298 A * 8/1966 Grundmann ............... 99/289 R
3,275,448 A 9/1966 Sommer
3,428,460 A 2/1969 Ely
3,589,272 A 6/1971 Bouladon
3,713,842 A 1/1973 Lubsen et al
3,812,273 A 5/1974 Schmidt
3,823,656 A 7/1974 Vekeka
3,888,999 A 6/1975 Jones et al
3,952,641 A 4/1976 Vitous
4,011,969 A * 3/1977 Martin ........................ 222/196
4,081,560 A 3/1978 Ishigaki
4,107,339 A 8/1978 Shrimpton
4,136,202 A 1/1979 Favre
4,158,330 A 6/1979 Vitous
4,254,694 A 3/1981 Illy
4,429,623 A 2/1984 Illy
4,436,125 A * 3/1984 Blenkush .................. 141/330
4,471,689 A 9/1984 Piana
4,581,239 A 4/1986 Woolman et al.
4,644,855 A 2/1987 Woolman et al.
4,798,732 A 1/1989 Osawa
4,829,889 A 5/1989 Takeuchi et al.
4,846,052 A 7/1989 Favre et al.
(Continued)

FOREIGN PATENT DOCUMENTS

BE 701863 1/1968
(Continued)

OTHER PUBLICATIONS

Brasilia S.p.A., PDM100 Spare Parts Catalog, Jan. 25, 2007, 35 pgs., Rev. No. 12, Retorbido, Italy.

*Primary Examiner* — Anthony Weier
(74) *Attorney, Agent, or Firm* — Sutherland Asbill & Brennan LLP

(57) ABSTRACT

A pod for mixing an amount of a dispersible material with water. The pod may include a pod body having a lower aperture and a poppet positioned within the aperture. The poppet may be sized so as to seal the lower aperture until a predetermined pressure is reached within the pod body.

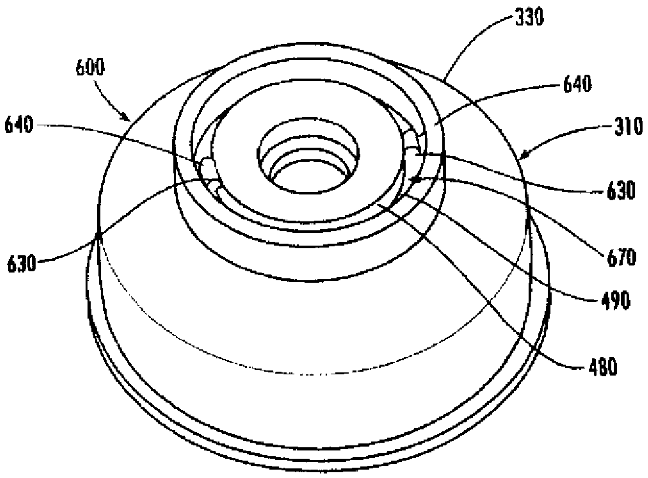

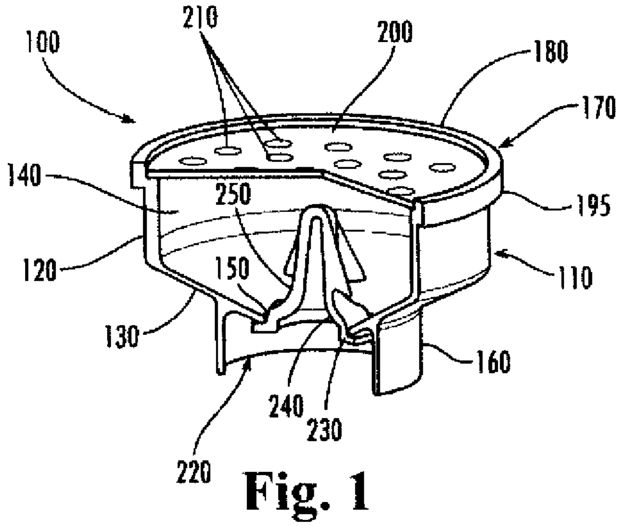
Fig. 1
Fig. 2
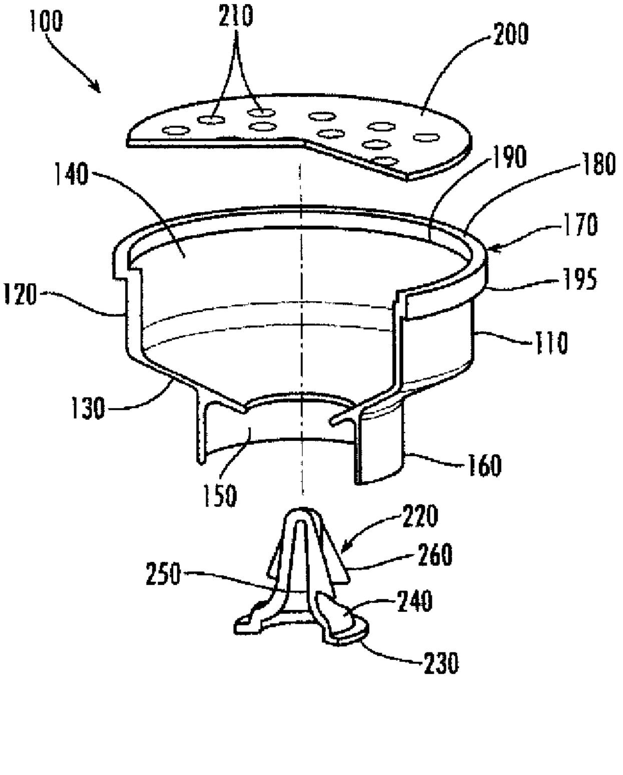

28 Claims, 6 Drawing Sheets